United States Patent [19]

Nitta et al.

[11] Patent Number: 5,751,440
[45] Date of Patent: May 12, 1998

[54] TRANSMISSION SPEED CONTROL SYSTEM FOR FACSIMILE PICTURE SIGNALS IN MOBILE RADIO COMMUNICATION

[75] Inventors: Yoshio Nitta; Akemi Kakizaki, both of Tokyo, Japan

[73] Assignee: NEC Corporation, Tokyo, Japan

[21] Appl. No.: 777,187

[22] Filed: Dec. 27, 1996

Related U.S. Application Data

[63] Continuation of Ser. No. 345,763, Nov. 22, 1994, abandoned.

[30] Foreign Application Priority Data

Nov. 26, 1993 [JP] Japan ......................... 5-297114

[51] Int. Cl.$^6$ ........................................ H04N 1/00
[52] U.S. Cl. .......... 358/434; 358/435; 358/436; 358/438; 358/439; 358/405
[58] Field of Search ........................... 358/400, 404, 358/405, 437, 434, 435, 436, 438, 439; 379/100, 93, 98; 455/54.1; 370/84; 375/377, 322; 371/22; H04N 1/00

[56] References Cited

U.S. PATENT DOCUMENTS 4,578,537 3/1986 Faggin et al. ....................... 379/100
5,050,004 9/1991 Morton, Jr. ........................ 358/434
5,159,465 10/1992 Maemura et al. .................. 358/405
5,253,079 10/1993 Nakatani et al. ................... 358/426
5,351,134 9/1994 Yaguchi et al. .................... 358/435

FOREIGN PATENT DOCUMENTS 4-90664 3/1992 Japan .

Primary Examiner—Thomas L. Stoll
Attorney, Agent, or Firm—Foley & Lardner

[57] ABSTRACT

A mobile facsimile communication system which can perform an optimum control of the transmission speed according to reception conditions in a radio section. The system includes a station on a picture signal receiving side and another station on a picture signal sending side. The station on the receiving side is provided with a speed estimating unit for estimating the current transmission speed, a counter for counting the number of error lines in the received picture signal, and a signal generator for generating a response signal depending in accordance with the current transmission speed and the number of error lines. The current transmission speed is measured preferably by a communication time for one-page of picture signal and the error line is measured preferably page by page. The station on the sending side is provided with a signal discriminator for receiving the response signal backwardly transmitted and for discriminating the response signal, and retraining unit for performing retraining procedure by changing the transmission speed based on the response signal.

7 Claims, 2 Drawing Sheets

TRANSMISSION SPEED CONTROL SYSTEM FOR FACSIMILE PICTURE SIGNALS IN MOBILE RADIO COMMUNICATION

This application is a continuation of application Ser. No. 08/345,763, filed Nov. 22, 1994, now abandoned.

BACKGROUND OF THE INVENTION

1. Field of the Invention

The present invention relates to a mobile radio communication system, and particularly to a system for controlling transmission speed in facsimile communication.

2. Description of the Related Art

When combining facsimile transmission in mobile radio communication, receiving conditions for the facsimile picture signal changes from moment to moment with movement of a mobile station or fading, and it is therefore necessary to control transmission speed according to receiving conditions to achieve facsimile transmission having few errors. Moreover, because mobile radio communication is more expensive than wire telecommunication, it is desirable to reduce communication time to a minimum.

Japanese patent Laid-open No. 90664/1992 (JP, A, 4-90664) discloses a facsimile transmission system in which a facsimile apparatus is added to a land mobile telephone and transmission speed is controlled according to the speed of the automobile and the strength of the received radiowaves. As shown in FIG. 1, the construction of this system can be broadly defined as including an on-board facsimile main unit 61, a network control unit (NCU) 62 which acts as the circuit interface, a radio unit 63 composed of a radio transmitter-receiver, a handset 64, a sensor 65 for detecting the speed of the automobile, and an antenna 66 connected to the radio unit 63. The NCU 62 is for switching connection of the radio unit 63 between the facsimile unit 61 and the handset 64, and the sensor 65 is connected to the facsimile unit 61.

The facsimile main unit 61 is made up of a scanner 71 for reading material to be sent, a recorder 72 for producing a recording on recording paper based on received data, a coder/decoder 73 for coding to and decoding from the facsimile transmission code, a communication controller 74 for controlling facsimile communication, a system controller 75 for controlling overall operation of this facsimile system, a console/display 76 made up of operation buttons and indicator panels, and a modem 77 for sending out transmission data TX modulated for the NCU 62 and demodulating received data RX from the NCU 62. In this apparatus, transmission speed is controlled in the system controller 75 based on the vehicle speed detected by the sensor 65 and the reception level information from the NCU 62. Transmission quality within the radio section varies due to fading brought about by movement of the vehicles, but with this system, by estimating and judging this transmission quality according to the vehicle speed and the intensity of the received radiowaves, transmission speed can be suitably controlled for suppression of transmission errors and reduction of communication time.

Nevertheless, this facsimile transmission system employs the speed of the vehicle carrying the facsimile as a standard for determining transmission speed control rather than a directly relevant standard: the level of errors in the received data occurring in actual communication. As a result, the above-described system is insufficient for more suitably controlling facsimile transmission speed to further reduce communication time and improve transmission efficiency.

SUMMARY OF THE INVENTION

The first object of the present invention is to provide a control system for the transmission speed of a facsimile picture signal that enables optimum control of the transmission speed depending on reception conditions and that enables reduction of communication time while preventing transmission errors.

The second object of the present invention is to provide a mobile radio communication system that performs facsimile communication, enables optimum control of the transmission speed depending on reception conditions, and enables reduction of communication time while preventing transmission errors.

The first object of the present invention is achieved by a picture signal transmission speed control system in a mobile radio communication system having radio terminals that performs facsimile communication, and comprises means on the picture signal receiving side for finding an estimated transmission speed in a radio section, means for counting the number of error lines in a received picture signal, and control means for controlling the transmission speed in facsimile communication depending on the estimated transmission speed and the number of error lines.

The second object of the present invention is achieved by a mobile radio communication system which performs facsimile communication and which is composed of a first station on the picture signal receiving side, a second station on the picture signal sending side, and the radio transmission path between the first and second stations; the first station including a first radio unit, a first modem connected to the first radio unit capable of changing data transmission speed, output means that decodes and outputs received picture signals, counting means that refers to the decoded data and counts the number of errors lines included in a one-page portion of picture signals, speed estimating means that measures the communication time of a one-page portion of picture signals and finds the current estimated transmission speed in the radio section, and response signal output means that selects a response signal according to the estimated transmission speed and the number of error lines and outputs the response signal to the second station by way of the first radio unit; and the second station including a second radio unit, a second modem connected to the second radio unit that is also compatible with the first modem, input means that codes picture signals based on inputted data, discriminating means that discriminates the response signals inputted by way of the second radio unit, and retraining means that performs retraining procedure while changing the transmission speed in accordance with the result of discrimination by the discriminating means.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 1:
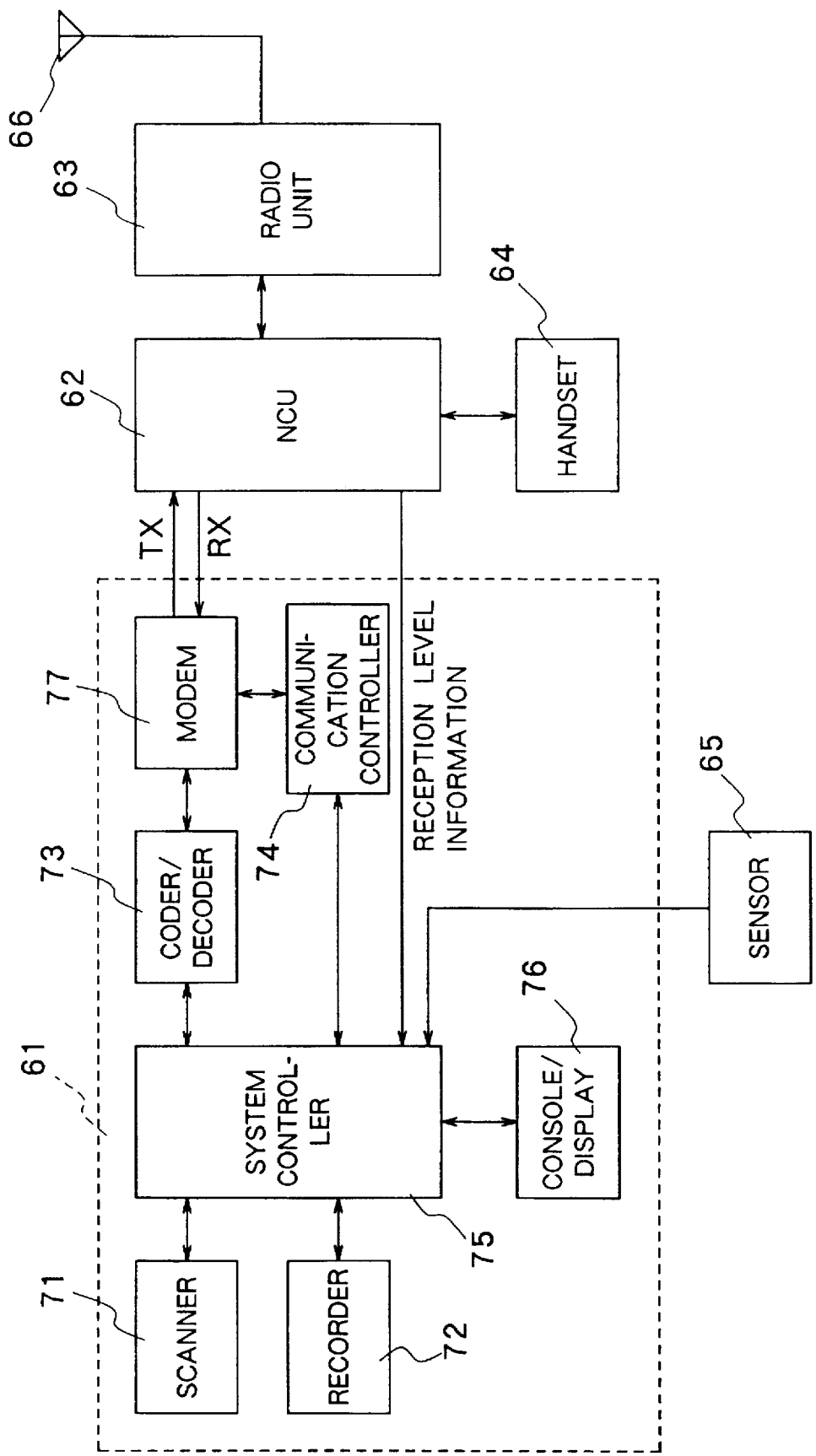
FIG. 1 is a block diagram showing the construction of a conventional radio facsimile apparatus.
Figure 2:
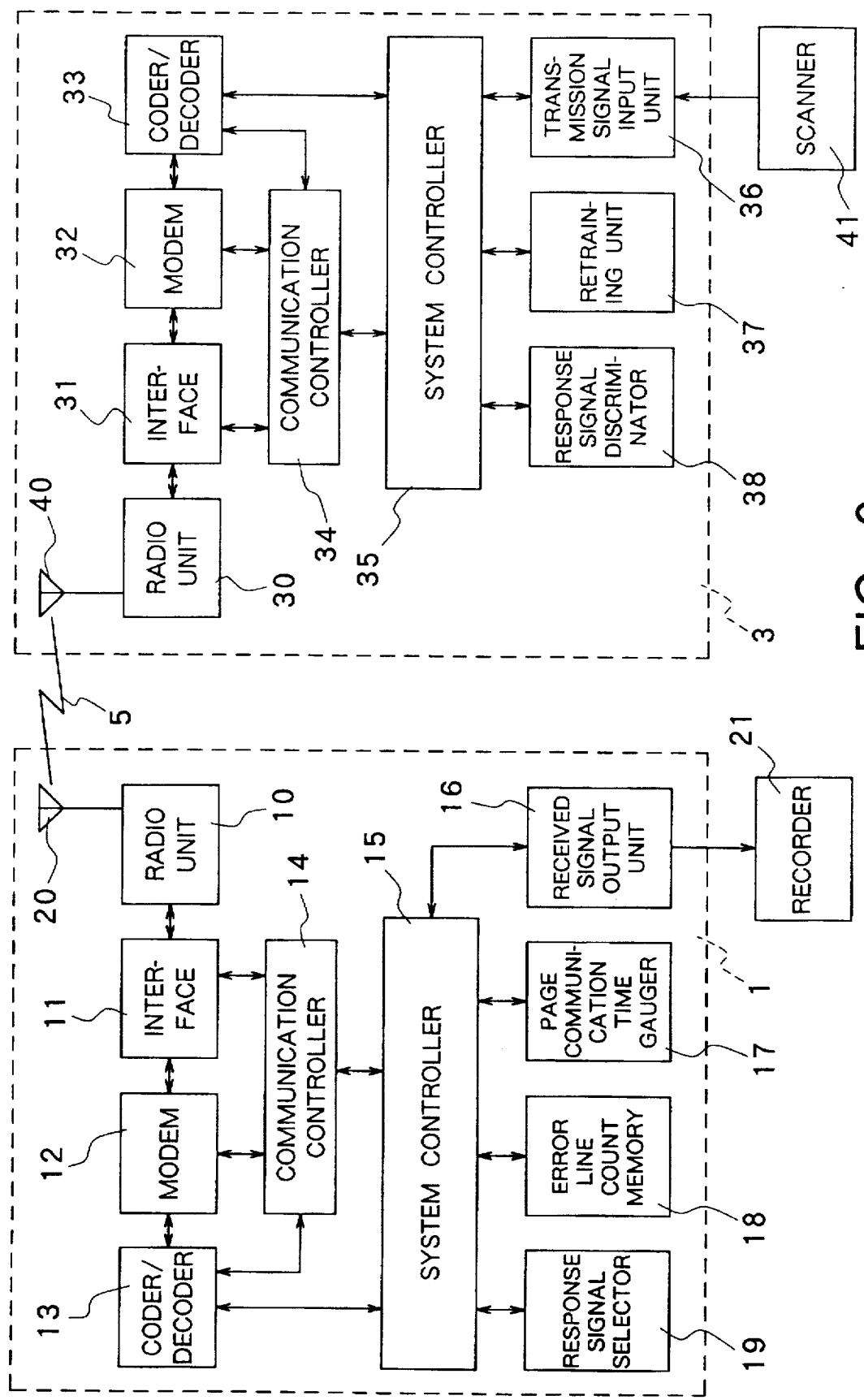
FIG. 2 is a block diagram showing the construction of a radio facsimile transmission system according to an embodiment of the present invention.

An example of a radio facsimile transmission system to which the facsimile picture signal transmission speed control system according to the present invention is applied is shown in FIG. 2. This transmission system is made up of a station 1 on the picture signal receiving side and a station 3 on the picture signal sending side. Station 1 and station 3 are joined by radio circuit 5, and the sending and receiving of control signals and transmission of picture signals necessary for facsimile communication are carried out between the two stations. At least one of stations 1 and 3 is a mobile station. Typically, the station on the picture signal receiving side, station 1, is installed in a mobile unit such as an automobile. Here, the stations on the receiving side and the sending side are distinguished, but it is also possible for the same station to perform both sending and receiving of picture signals.

An antenna 20, a radio unit 10 composed of a radio transmitter-receiver connected to the antenna 20, a modem 12 that performs modulation and demodulation of facsimile transmission signals or various types of control signals, an interface 11 which connects the radio unit 10 and the modem 12, and a coder/decoder (codec) 13 connected to the modem 12 that codes and decodes picture signals are provided in station 1 on the picture signal receiving side. The interface 11 is constructed as a signal converter for enabling transmitting signals to and receiving signals from the radio unit 10. A device capable of performing communication while freely switching between a plurality of data transmission speeds is employed as the modem 12. For example, a modem may be employed which is provided with four data transmission speeds: 9600 bps, 7200 bps, 4800 bps, and 2400 bps.

In addition, this station 1 is provided with a communication controller 14 that directly controls the interface 11, the modem 12 and the coder/decoder 13; a system controller 15 that controls the overall operation of this station 1; a received signal output unit 16 that outputs to the outside picture signals received under the control of the system controller 15; a page communication time gauger 17 that measures the communication time per page of picture signals; an error line count memory 18 that counts the number of line errors for each page; and a response signal selector 19 that selects a response signal to be sent to the picture signal sending side. The system controller 15, in addition to performing overall control of station 1, also executes control through facsimile transmission procedures. A device such as a recorder 21 can also be connected to the received signal output unit 16 for recording to recording paper in accordance with received picture signals.

The page communication time gauger 17 is provided to estimate the current effective transmission speed on the radio transmission path by measuring the facsimile communication time for receiving picture signals from the beginning to the completion of one page for each page. The error line count memory 18 counts and stores the number of error lines in the picture signal detected by the coder/decoder 13 for each page. The response signal selector 19 selects and determines a response signal to control the transmission speed of the picture signal based on the current estimated effective transmission speed and the number of error lines. The response signal is sent to station 3 on the sending side upon completion of receiving a one-page portion of picture signals. At station 3 on the sending side, the picture signal transmission speed is changed based on the response signal. The page communication time gauger 17, the error line counter memory 18, and the response signal selector 19 operate under the control of the system controller 15 and can be constructed as hardware or firmware.

At station 3 on the picture signal sending side are provided an antenna 40, a radio unit 30 made up of a radio transmitter-receiver connected to the antenna 40, a modem 32 that modulates and demodulates facsimile transmission signals or control signals, an interface 31 that connects the radio unit 30 and the modem 32, and a coder/decoder 33 connected to the modem 32 that codes and decodes picture signals. The interface 31 is constructed as a signal converter for enabling sending and receiving signals to and from the radio unit 30. A device equivalent to modem 12 provided in station 1 on the receiving side is employed as modem 32.

In addition, this station 3 is provided with a communication controller 34 that directly controls the interface 31, the modem 32, and the coder/decoder 33; a system controller 35 that controls overall operation of this station 1; a transmission signal input unit 36 that inputs picture signals to be sent under the control of system controller 35; a retraining unit 37 that performs retraining procedure; and a response signal discriminator 38 that discriminates the type of response signal from station 1 on the receiving side. System controller 35, in addition to performing overall control of station 1, executes control through facsimile transmission procedures. A device such as a scanner 41 that reads a document can also be connected to transmission signal input unit 36. The retraining unit 37 and the response signal discriminator 38 operate under the control of system controller 35 and can be constructed as hardware or firmware. The retraining unit 37 commences operation upon discrimination of the response signal at the response signal discriminator 38 and performs retraining procedure in accordance with the type of response signal.

Facsimile transmission in this facsimile transmission system will next be explained. Here, it is assumed that the radio transmission path for facsimile communication between radio units 10 and 30 is already established. It is also assumed that negotiation including setting of the transmission speed according to reception conditions at this time is carried out between the two stations 1, 3 in accordance with normal facsimile communication procedures and negotiation procedures between modems.

Facsimile communication begins, and when the first page of picture signal begins to be transmitted from station 3 on the sending side to station 1 on the receiving side by way of the radio transmission path 5, at station 1 on the receiving side, signals from radio unit 10 are converted in interface 11 to signals receivable by modem 12 and sent to modem 12. Communication controller 14, which controls modem 12, senses the beginning of picture signal reception and notifies system controller 15 of the start of a page of communication. Upon picking up the beginning of a page of communication, system controller 15 sends a command to the page communication time gauger 17 to commence measurement of communication time. The page communication time gauger 17, upon receiving the command to commence measurement, begins gauging the communication time. Simultaneously, the coder/decoder 13 decodes picture signal data from modem 12. The decoded picture signal data is sent to the received signal output unit 16 by way of system controller 15 and is outputted to the recorder 21. If a line which cannot be decoded normally should occur when decoding the picture signal data, the coder/decoder 13 notifies system controller 15 of the occurrence of an error line.

Upon picking up the occurrence of an error line, system controller 15 directs the error line count memory 18 to count the number of occurrences of error lines, and upon being directed to count, the error line count memory 18 counts up the number of error lines. Upon sensing the completion of reception of one page of picture signals, the communication controller 14 notifies system controller 15 of the completion of page communication.

System controller 15, upon receiving up the completion of page communication, sends a command to the page communication time gauger 17 to complete measurement of communication time, and the page communication time gauger 17, upon picking up the command to complete communication time measurement, stops gauging communication time and notifies system controller 15 of the measured page communication time T. System controller 15 calculates an estimated effective transmission speed V for the radio section from the received page communication time T, and simultaneously, reads the number of error lines E that have occurred during communication of one page. System controller 15 then sends to the response signal selector 19 the estimated effective transmission speed V and the number of error lines E. The response signal selector 19, upon taking in the estimated effective transmission speed V and the number of error lines E, selects a response signal based on predetermined standards and forwards the response signal to system controller 15.

In the present embodiment, three types of response signals, MCF, RTP, and RTN, have been prepared, and one of these is selected. MCF is a signal directing a one-step increase in transmission speed, RTP is a signal directing no change in transmission speed, and RTN is a signal directing a one-step decrease in transmission speed. Table 1 shows the selection standards for the response signals.

TABLE 1

| E | V >= V' | V < V' |
|---|---------|--------|
| 0 | MCF | RTN |
| 1–20 | RTP | RTN |
| Over 20 | RTN | RTN |

E: number of error lines
V: an estimated value of the effective transmission speed in the radio circuit area
V': a transmission speed value negotiated between the sending and receiving sides In other words, if the number of error lines E counted by the error line count memory 18 is zero, and moreover, if the estimated effective transmission speed V is greater than the transmission speed V' negotiated between the sending and receiving sides at the time facsimile communication commenced, an MCF signal is outputted; if the number of error lines E is equal to or greater than one but less than a prescribed value (here 20), and moreover, the estimated effective transmission 10 speed V is greater than the negotiated transmission speed V', an RTP signal is outputted; and if the estimated effective transmission speed V is less than the negotiated transmission speed V' or the number of error lines E is greater than the prescribed value, an RTN signal is outputted. System controller 15 sends the forwarded response signal to communication controller 14. Communication controller 14 outputs the received response signal to modem 12 and sends the response signal to station 3 on the sending side by way of interface 11 and radio unit 10.

The response signal, upon being received by station 3 on the sending side by way of the radio transmission path 5, is inputted to communication controller 34 by way of interface 31 and modem 32. Communication controller 34 forwards the response signal to system controller 35, and system controller 35 sends the forwarded response signal to the response signal discriminator 38. The response signal discriminator 38, in accordance with predetermined rules, directs the retraining unit 37 by way of system controller 35 to execute retraining procedure of the transmission speed according to the received response signal. The rules for the present embodiment are shown in Table 2.

TABLE 2

| Response signal | Processing upon reception |
|-----------------|---------------------------|
| MCF | Transmission speed increased one step; retraining carried out |
| RTP | No action |
| RTN | Transmission speed decreased one step; retraining carried out |

In other words, when the response signal is MCF, the transmission speed is made one step faster and retraining is carried out; and when the response signal is RTP, the current transmission speed is left unchanged and communication is continued without carrying out retraining. When the response signal is RTN, the transmission speed is made one step slower and retraining is carried out.

In this way, the retraining unit 37 effects retraining procedure of the transmission speed in accordance with the response signal, and simultaneously, the transmission speed of modem 32 and the coding/decoding speed of coder/decoder 33 are controlled through communication controller 34. Accordingly, communication of the next page can be carried out at a transmission speed altered according to the response signal, i.e., a transmission speed that conforms to the conditions of the radio transmission path 5. Consequently, transmission efficiency can be increased while preventing reception errors.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A picture signal transmission speed control system in a mobile radio communication system having radio terminals that perform a facsimile communication over a radio communications link, comprising:

speed estimating means, on a picture signal receiving side, for finding an estimated transmission speed in the radio communications link based only on an actual picture signal received over the radio communications link;

counting means for counting a number of error lines in a received picture signal sent over the radio communications link; and control means for controlling the transmission speed of the transmitted picture signal in the facsimile communication depending on the estimated transmission speed and the number of error lines, wherein said control means comprises:
response signal output means provided in a first station on the picture signal receiving side for outputting response signals in accordance with the estimated transmission speed and the number of error lines;

transmitting means for transmitting said response signals to a second station on a picture signal sending side; and retraining means provided in said second station on the picture signal sending side for executing a retraining procedure by changing the transmission speed based on said response signals received, wherein said response signal output means generates said response signals in accordance with a result of comparison of the number of error lines with a first value and a result of comparison of the estimated transmission speed with a second value, and wherein a first signal is generated by said response signal output means when the estimated transmission speed is equal to or greater than said second value and the number of error lines is zero, a second signal is generated by said response signal output means when the estimated transmission speed is equal to or greater than said second value and the number of error lines is one or more but less than said first value, and a third signal is generated by said response signal output means when the number of error lines is equal to or greater than said first value or the estimated transmission speed is less than said second value.

2. The picture signal transmission speed control system according to claim 1, wherein said first signal is an MCF signal for directing a one-step increase of the transmission speed, said second signal is an RTP signal for indicating no change in the transmission speed, and said third signal is an RTN signal for indicating a one-step decrease in the transmission speed; and wherein said response signal output means selects and outputs one signal from among said first, second and third signals.

3. The picture signal transmission speed control system according to claim 1, wherein said speed estimating means includes page communication time gauging means for gauging a picture signal communication time for a one-page portion and calculates the estimated transmission speed from the picture signal communication time for the one-page portion; and said counting means counts the number of error lines within the one-page portion.

4. The picture signal transmission speed control system according to claim 1, wherein said second value is a transmission speed value which is determined based on a facsimile communication procedure that is initiated before a beginning of transmission of picture signals in the facsimile communication.

5. The picture signal transmission speed control system according to claim 4, wherein said first signal is an MCF signal for directing a one-step increase of the transmission speed, said second signal is an RTP signal for indicating no change in the transmission speed, and said third signal is an RTN signal for indicating a one-step decrease in the transmission speed; and wherein said response signal output means selects and outputs one signal from among said first, second and third signals.

6. A picture signal transmission speed control system in a mobile radio communication system having radio terminals that perform a facsimile communication over a radio communications link, comprising:

speed estimating means, on a picture signal receiving side, for finding an estimated transmission speed in the radio communications link;

counting means for counting a number of error lines in a received picture signal sent over the radio communications link; and control means for controlling the transmission speed of the transmitted picture signal in the facsimile communication depending on the estimated transmission speed and the number of error lines, wherein said control means comprises:

response signal output means provided in a first station on the picture signal receiving side for outputting response signals in accordance with the estimated transmission speed and the number of error lines;

transmitting means for transmitting said response signals to a second station on a picture signal sending side; and retraining means provided in said second station on the picture signal sending side for executing a retraining procedure by changing the transmission speed based on said response signals received, wherein said response signal output means generates said response signals in accordance with a result of comparison of the number of error lines with a first value and a result of comparison of the estimated transmission speed with a second value, wherein said second value is a transmission speed value which is determined based on a facsimile communication procedure that is initiated before a beginning of transmission of picture signals in the facsimile communication, wherein said response signals include at least three types: a first signal for directing an increase of the transmission speed, a second signal for directing no change in the transmission speed, and a third signal for directing a decrease in the transmission speed; and said response signal output means selects and outputs one signal from among said first, second and third signals, and wherein said first signal is selected when the estimated transmission speed is equal to or greater than said second value and the number of error lines is zero, said second signal is selected when the estimated transmission speed is equal to or greater than said second value and the number of error lines is one or more but less than said first value, and said third signal is selected when the number of error lines is equal to or greater than said first value or the estimated transmission speed is less than said second value.

7. A mobile radio communication system which performs facsimile communication and which includes a first station on a picture signal receiving side, a second station on a picture signal sending side, and a radio transmission path between said first and second stations;

said first station including a first radio unit, a first modem connected to said first radio unit capable of changing a data transmission speed, output means for decoding and for outputting picture signals received over the radio transmission path, counting means for referring to the decoded picture signals and for counting a number of errors lines included in a one-page portion of the decoded picture signals, speed estimating means for measuring a communication time of the one-page portion of the decoded picture signals and for finding a current estimated data transmission speed of data sent over the radio transmission path, and response signal output means for selecting a response signal according to the estimated data transmission speed and the number of error lines and for outputting said response signal to said second station by way of said first radio unit, the response signal being a first signal for directing an increase of the transmission speed when the estimated transmission speed is equal to or greater than a first value and the number of error lines is zero, the response signal being a second signal for directing no change in the transmission speed when the estimated transmission speed is equal to or greater than the first value and the number of error lines is one or more but less than a second value, and the response signal being a third signal for directing a decrease of the transmission speed when the number of error lines is equal to or greater than the second value or the estimated transmission speed is less than the first value; and said second station including a second radio unit, a second modem connected to said second radio unit that is also compatible with said first modem, input means for coding picture signals based on inputted data, discriminating means for discriminating said response signals inputted by way of said second radio unit, and retraining means for performing a retraining procedure while changing the data transmission speed in accordance with the discrimination result made by said discriminating means.

* * * * *